No. 10,693.  
B. G. FITZHUGH.  
HARVESTER OF GRAIN.  
PATENTED MAR. 28, 1854.
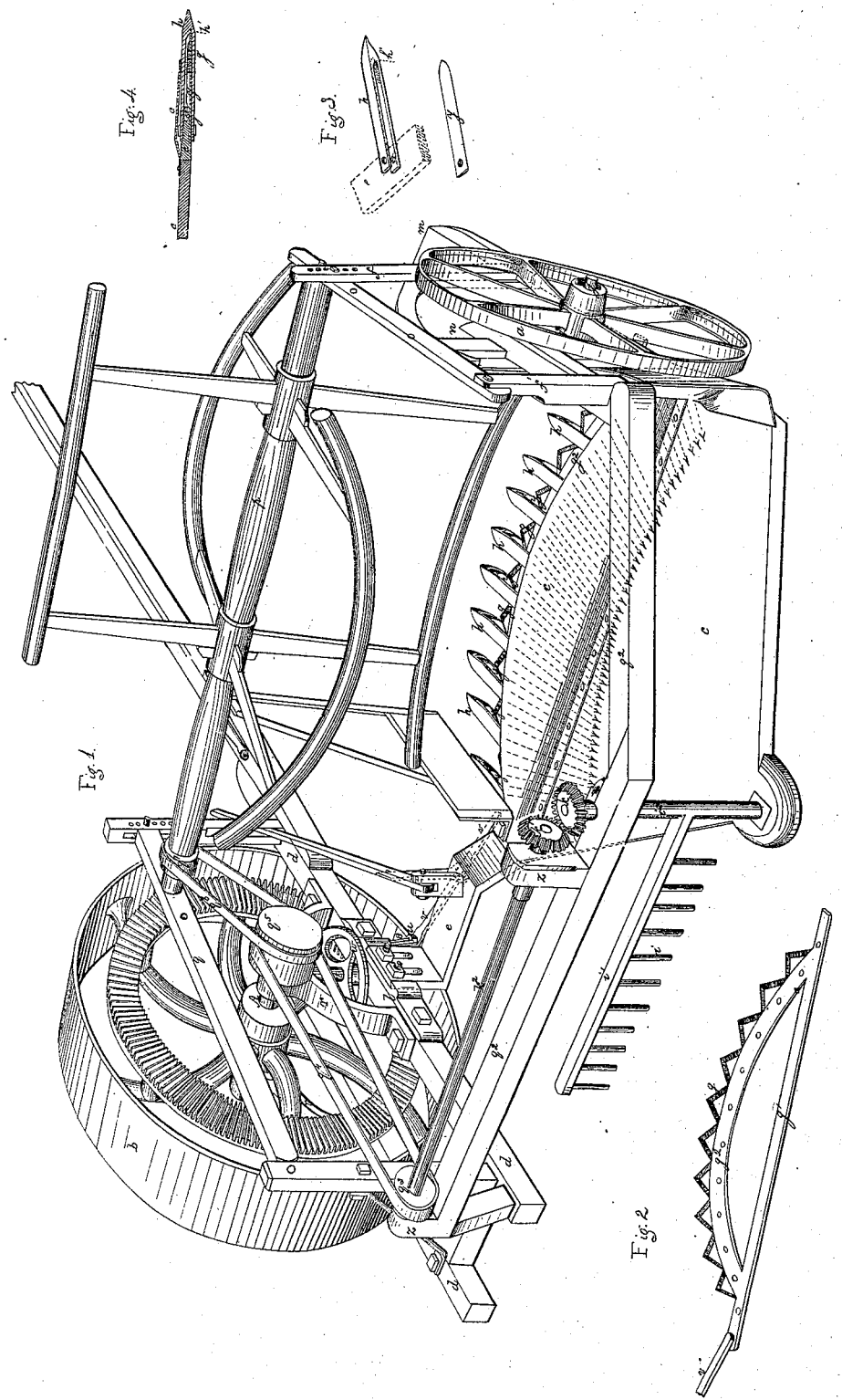

UNITED STATES PATENT OFFICE.

BENJN. G. FITZHUGH, OF FREDERICK, MARYLAND.

IMPROVEMENT IN HARVESTERS OF GRAIN.

Specification forming part of Letters Patent No. 10,693, dated March 28, 1854.

*To all whom it may concern:*

Be it known that I, BENJAMIN G. FITZHUGH, of Frederick, in the county of Frederick and State of Maryland, have invented a new and useful Improvement in Harvesting-Machines, of which the following is a full, clear, and exact description, reference being had to the accompanying drawings, which make part of this specification, and in which—

Figure 1 represents a view in perspective of my improved machine; Fig. 2, a like view of the cutter detached from the machine; Fig. 3, similar views of one of the fingers and its removable steel blade detached; and Fig. 4, a section through one of the fingers, knife, and portion of the platform.

My invention and improvement consists in fitting the fingers which support the grain against the action of the cutters with removable blades, which can readily be removed to be sharpened or repaired and then put back again, thus rendering it unnecessary when the cutting-edge gets damaged to throw away the whole finger, and while these facilities are secured the construction and arrangement of the parts are such that no joint is made in the front end of the finger in which grain or grass would be liable to become entangled.

My invention and improvement further consists in arranging the fingers and making the edge of the knife in a curve, so that the latter will cut the grain in a curved line, although it has a rectilinear reciprocating motion, thus adapting it to be raked by a continuously-rotating sweep-rake.

My invention further consists in making the beaters of the reel curved to adapt them to the curvature of the knife-fingers and platform, and to cause them to deposit the grain upon the platform with the heads of the stalks converging toward its center, which greatly facilitates its removal by the sweep-rake.

My invention further consists in the combination of the continuously-revolving sweep-rake with the continuously-revolving reel and the curved knife, the three being reciprocally adapted to each other, as hereinafter more particularly described.

The accompanying drawings represent a harvester to which my improvement is applied supported on two wheels, the one, *a*, light to support the inner end of the platform *c*, or that next the standing grain, the other, *b*, heavy to support the outer end of the platform and the driving-gear, and to impart motion to the latter. The main driving-gear is mounted in a strong frame, *d*, to the front end of which a tongue is attached, by which the horses draw the machine. A strong bar, *e*, connects the frame of the two wheels *a* and *b* and carries the platform *e*, cutter *g*, fingers *h*, and rake *i*. This bar *e* may be adjusted at different heights to raise and lower the cutter as required to cut grain at different distances from the ground. This adjustment is effected at the inner end by raising and lowering the pivot *j* on which the wheel *a* turns, and at the outer end by raising and lowering the end of the bar, which is bent at right angles and fitted in a groove formed on a plate, *l*, secured to the frame *d*. On the inner end of the platform an angular dividing-bar, *m*, projects forward to separate the grain to be cut from that which is to be left standing. On this bar a guard or fence, *n*, is erected, at the inner end of the platform, to prevent the cut grain from becoming entangled in the wheel *a*. Two standards, *f* and *f'*, above this dividing-bar, are erected to support a light horizontal rail, *o*, whose rear end is hinged to the rear standard, *f'*, and its front end made adjustable to different heights on the front standard, in order that the reel, the inner end of whose shaft, *p*, is supported on this rail *o*, may be held at different distances above the cutter to suit varying growths of grain. The outer end of the shaft *p* of the reel is supported in bearings in a rail, *q*, on the inner side of the frame *d*. This rail *q* is raised and lowered, like the rail *o*, by being hinged to the rear post, and raised and lowered in the front post by which it is upheld. The axle of the main driving-wheel runs in bearings formed in the upper part of the standards *r* on the frame *d*. On this axle, between the driving-wheel and the inner bearing, a bevel-wheel is mounted which gears into a pinion, *s*, on the lower end of an upright spindle, *t*. The lower extremity of this spindle has a crank, *u*, fitted to it, whose wrist-pin is connected to the back of the cutter *g* by a connecting-rod, *v*, which, when the machine is in motion and the crank is revolved, imparts to the knife a reciprocating motion. This motion is rendered more equable by a balance-wheel, *w*, on the crank-shaft.

The cutter *g* is composed of a straight back or bar, *g'*, united to a curved or arched bar, $q^2$, to support the cutter, which is also curved. This curvature of the cutter corresponds to the curved line in which the fingers are arranged, the frame of the cutter and its back resembling a bow and string, the opening within the same giving ample room for the discharge of grass and other obstructions that may happen to get between the fingers. The back of the cutter slides back and forth in guides that keep it in place. The fingers each consist of a forked piece of metal suitably pointed, the opening or slot between the forks being for the cutter to work in. One branch of the fork is attached to the upper and the other to the lower side of the bar $e$. Upon the upper side of the lower branch of the fork of the finger a blade of steel, $y$, is placed, its front end entering a recess, $h'$, at the bottom of the fork to keep it in place, and its rear end being held by the screw which secures the branch of the finger to the bar $e$. These knives or blades are made of tempered steel, and can easily be kept sharp, and when worn out or broken can readily be replaced by new ones. By having thin sharp blades on the fingers, to act in connection with the reciprocating cutter, the grain will be cut with much less strain upon the machinery, and with less power than is ordinarily consumed by the operation.

The rake consists of an arm, $i'$, with teeth projecting from its under side. This arm is secured in a horizontal position to an upright shaft, $i^2$, resting at its lower end in a step upon the rear edge of the platform, and held at its upper end by a box on a rail, which connects the guard on the inner end of the machine with the frame $d^2$, that carries the driving-gear. When the rake is turned round its teeth barely clear the platform as they sweep over its surface. If carried too high, they would not sweep the grain off properly, and if carried too low they would strike the edge of the platform and be in danger of breaking. The curve of the knife, fingers, and front of the platform is the segment of a circle whose center and that of the rake-shaft coincide. The length of the rake should be such that its outer end will reach to the outer edge of the platform, but will not extend over the fingers. As the rake turns round it sweeps the grain before it from the platform and permits it to drop down in a heap suitable for a bundle. As the platform is about a quadrant of a circle, the rake is only occupied a quarter of its revolution in sweeping off the grain. On the top of the shaft which carries the rake a miter-wheel, $k$, is secured, which is driven by a second miter-wheel, $k'$, mounted on the end of a horizontal shaft, $k^2$, resting in bearings in standards $z\,z$ on the rail $q^2$. This shaft derives its motion, through a pulley, $q^3$, and belt $q^4$, from a drum, $q^5$, on the inner end of the main driving-shaft A. The drum also carries a second belt, $q^6$, which encircles a pulley, $q^7$, on the shaft of the reel to give a rotary motion to the same. This reel is constructed in the usual manner, except that its beaters are curved to correspond with the curvature of the platform, fingers, and knife. By giving to the beaters this form the reel is adapted to a curved reciprocating knife, or to a circular rotary knife, as well as to a straight knife. The curvature of the beaters may be greater or less than that of the platform, and instead of being curved they may be angular or polygonal, the object being to press the grain back against the ends of the cutters as soon, or thereabout, as it is pressed against the middle. This form of the beater tends to deposit the grain on the platform with its stalks converging toward the axis of the rake, as shown by the series of red arrows represented on the platform.

Most of the parts of the machinery, it is obvious, admit of very considerable variations in structure and arrangement to adapt them to different circumstances; but it is unnecessary to describe them, as such changes will readily suggest themselves to any competent constructor of such machines.

I make no claim to the removable blade $y$ in itself, as such a blade has heretofore been used.

What I claim as my invention, and desire to secure by Letters Patent, is—

1. The removable blade in the fingers, arranged and secured in place in the manner and for the purposes herein set forth.

2. The combination of a curved reciprocating knife with a curved row of fingers and a curved platform, as herein described.

3. Constructing the reel with curved beaters, substantially in the manner and for the purpose herein set forth.

4. The combination of a continuously-revolving sweep-rake with a revolving reel which disposes the grain upon the platform with its stalks converging to the axis of the rake, substantially as herein set forth.

In testimony whereof I have hereunto subscribed my name.

B. G. FITZHUGH.

Witnesses:
  P. H. WATSON,
  SAML. GRUBB.